(12) United States Patent
Karakas

(10) Patent No.: US 7,291,803 B2
(45) Date of Patent: Nov. 6, 2007

(54) METHOD AND DEVICE TO OBTAIN INFORMATION TO EVALUATE THE QUALITY OF A RESISTANCE WELDING CONNECTION AND/OR TO CONTROL OR REGULATE A RESISTANCE WELDING METHOD

(76) Inventor: Erdogan Karakas, Lindenallee 11, 30938 Burgwedel (DE)

( * ) Notice: Subject to any disclaimer, the term of this patent is extended or adjusted under 35 U.S.C. 154(b) by 0 days.

(21) Appl. No.: 11/315,589

(22) Filed: Dec. 23, 2005

(65) Prior Publication Data

US 2006/0157452 A1    Jul. 20, 2006

Related U.S. Application Data

(63) Continuation of application No. PCT/EP2004/006939, filed on Jun. 25, 2004.

(30) Foreign Application Priority Data

Jun. 26, 2003   (DE) ................. 103 28 635

(51) Int. Cl.
    *B23K 11/24* (2006.01)
(52) U.S. Cl. ..................................... 219/110
(58) Field of Classification Search ............... 219/109, 219/110
    See application file for complete search history.

(56) References Cited

U.S. PATENT DOCUMENTS

| | | | |
|---|---|---|---|
| 5,229,568 A | 7/1993 | Gobez et al. | |
| 5,742,023 A | * 4/1998 | Fortmann | 219/109 |
| 6,586,701 B2 | 7/2003 | Karakas | |
| 6,633,016 B2 | 10/2003 | Karakas | |

FOREIGN PATENT DOCUMENTS

| | | |
|---|---|---|
| DE | 31 21 497 C2 | 4/1982 |
| DE | 37 10 727 A1 | 10/1988 |
| DE | 40 39 847 C2 | 6/1992 |
| DE | 43 28 337 C1 | 12/1994 |
| DE | 43 28 363 A1 | 3/1995 |
| DE | 43 30 914 A1 | 3/1995 |
| DE | 43 38 449 C2 | 3/1997 |
| DE | 297 15 999 U1 | 4/1998 |

(Continued)

OTHER PUBLICATIONS

International Search Report dated Nov. 2, 2004 in PCT application No. PCT/EP2004/006939, filed Jun. 25, 2004 (5 pages).

(Continued)

*Primary Examiner*—Clifford C. Shaw
(74) *Attorney, Agent, or Firm*—Shlesinger, Arkwright & Garvey LLP

(57) ABSTRACT

Method and device for obtaining information to evaluate the quality of a resistance welding connection and/or to control or regulate a resistance welding method. Method and device include performing a resistance welding procedure on workpieces, performing a step including one of obtaining information to evaluate one of a quality of a resistance welding connection during the resistance welding procedure, controlling the resistance welding procedure, and regulating the resistance welding procedure, and measuring a first voltage between a first welding electrode and a first workpiece of the workpieces being welded during the resistance welding procedure.

30 Claims, 5 Drawing Sheets

FOREIGN PATENT DOCUMENTS

| | | |
|---|---|---|
| DE | 199 15 121 C2 | 10/2000 |
| EP | 0 835 713 A1 | 4/1998 |
| FR | 2 694 899 | 2/1994 |
| JP | 11-77323 A * | 3/1999 |
| JP | 11077323 | 3/1999 |
| WO | 92/10326 | 6/1992 |
| WO | 95/13163 | 5/1995 |

OTHER PUBLICATIONS

Lehmkuhl, B., et al., "Fortschritte in der Prozessdatenerfassung und Prozessdatenverarbeitung beim Widerstandspressschweissen", in *Schweissen und Schneiden*, 42 (1990), vol. 1, pp. 26-29, dated Mar. 7, 1990.

* cited by examiner

METHOD AND DEVICE TO OBTAIN INFORMATION TO EVALUATE THE QUALITY OF A RESISTANCE WELDING CONNECTION AND/OR TO CONTROL OR REGULATE A RESISTANCE WELDING METHOD

CROSS-REFERENCE TO RELATED APPLICATIONS

This application is a continuation of application no. PCT/EP2004/006939, filed Jun. 25, 2004, which claims the priority of German application no. 103 28 635.7, filed 26 Jun. 2003, and each of which is incorporated herein by reference.

FIELD OF THE INVENTION

The invention relates to a method for obtaining information to evaluate the quality of a resistance welding connection and/or to control or regulate a resistance welding method. More particularly, the invention relates to a method for obtaining information to evaluate the quality of a resistance welding connection and/or to control or regulate a resistance welding method, the method including performing a resistance welding procedure on workpieces, performing a step including one of obtaining information to evaluate one of a quality of a resistance welding connection during the resistance welding procedure, controlling the resistance welding procedure, and regulating the resistance welding procedure, and measuring a first voltage between a first welding electrode and a first workpiece of the workpieces being welded during the resistance welding procedure.

BACKGROUND OF THE INVENTION

Various methods are known for obtaining information to evaluate the quality of a resistance welding connection and/or to control or regulate a resistance welding method. For example, WO 03/028936 A2 discloses a device for obtaining information to control a resistance welding method in which measuring equipment is provided to detect the temperature of the welding electrodes and/or the workpiece. The prior-art device is used to detect the temperature of the welding electrodes and/or workpiece during the welding process to gain information on the progress of the welding method. If, for example, measuring the temperature of the welding electrodes indicates that one of the welding electrodes is hotter than the other, one can deduce that a weld nugget that has formed on the contact surface between the workpieces being welded is shifting toward the hotter welding electrode, which is undesirable in certain circumstances. To prevent such a shift and obtain a symmetrical arrangement in relation to the contact surface between the workpieces being welded, the parameters of the welding method can be controlled or regulated as a function of the measured temperatures. The prior art device provides very precise information on the temperature of the welding electrodes; however, a substantial amount of equipment is required.

Similar devices are also known from Patent Abstracts of Japan, vol. 004, no. 154 (M-038), Oct. 28, 1980 & JP 55106693 A, U.S. Pat. No. 4,214,164 A, EP 0 252 624 A, Patent Abstracts of Japan, vol. 005, no. 172 (M-095), Oct. 31, 1981 & JP 56099082 A, WO 00/59673 A, DE 34 16 733 C, CH 411 166 A and U.S. Pat. No. 5,093,553 A.

A method to obtain information to evaluate the quality of a resistance welding connection is also known in DE 43 28 363 C2, DE 43 28 337 C1 and WO 92/10326.

Furthermore, DE 43 38 449 C2 discloses a method to obtain information to evaluate the quality of a resistance welding connection in which, after welding is over, a thermoelectric voltage is measured between one of the welding electrodes and the workpiece that it contacts. A disadvantage of the known method is that it is not suitable to control a resistance welding method during welding.

OBJECTS AND SUMMARY OF THE INVENTION

An object of the invention is to overcome the drawbacks of the prior art.

Another object of the invention is to provide a method of performing a resistance welding procedure that, for example, is suitable both to obtain information for evaluating the quality of a resistance welding connection after welding, and to control or regulate the resistance welding procedure while welding, and that provides reliable information on workpiece(s) being welded.

A further object of the invention is to provide a device for carrying out the inventive method of performing a resistance welding procedure that, for example, is suitable both to obtain information for evaluating the quality of a resistance welding connection after welding, and to control or regulate the resistance welding procedure while welding, and that provides reliable information on workpiece(s) being welded.

These and other objects is solved by the teaching according to the invention concerning the inventive method and device for performing the various embodiments of the resistance welding procedures and devices set forth herein.

According to the invention, at least one first voltage is measured during welding between a first welding electrode and a first workpiece being welded.

The invention abandons the widespread concept of measuring the overall electrical output dissipated during welding that consists of the product of the welding current flowing during welding and the voltage applied to the welding electrodes. Instead, the invention is based on a differentiated perspective according to which the overall output is composed primarily of the following three output components:

1. Output dissipated at the contact surface between the positive welding electrode and one of the workpieces;
2. Output dissipated at the contact surface between the workpieces being welded; and
3. Output dissipated at the contact surface between the negative electrode and the other workpiece.

The invention is further based on the concept that the output components cited under item 2 cause the formation of a weld nugget on the contact surface between the workpieces being welded, while the output component cited under item 1 causes the positive welding electrode to be heated, and the output component cited under item 2 causes the negative welding electrode to be heated. Furthermore, the invention is based on the concept that the above-cited output component according to item 1 is dissipated by the transfer resistance between the positive welding electrode and workpiece that it contacts, and the above-cited output component according to item 3 is dissipated by the transfer resistance between the negative welding electrode and workpiece that it contacts. Since the same welding current flows through the two welding electrodes and the workpieces that are welded during the welding process, the invention makes use of the fact that, based on the above concepts, a deviation between output components as defined according to items 1 and 3 means that a first voltage between the first welding electrode and a first workpiece of the workpieces to be welded deviates from a first voltage between the second welding electrode a second workpiece of the workpieces to be welded.

Based on this fact, information can be obtained on whether the above output components according to 1 and 3 are the same or different, for example by measuring the first and second voltages and comparing them. If for example measuring the first and second voltages reveals that both voltages are the same, this means that the above output component as defined under 1 essentially corresponds to the above output component as defined under 3, i.e., the output dissipated between the positive welding electrode and the workpiece that it contacts is essentially the same as the output between the negative welding electrode and the workpiece that it contacts. Consequently, the two welding electrodes are approximately heated to the same extent, which leads to the formation of an essentially symmetrical weld nugget in relation to the contact surface between the workpieces to be welded.

If a measurement of the first voltage and second voltage contrastingly shows that the first voltage is higher than the second voltage, this means that the above output component as defined under 1 is larger than the above output component as defined under 3; i.e., the output dissipated between the positive welding electrode and workpiece that it contacts is higher than the output dissipated between the negative welding electrode and the workpiece that it contacts. Accordingly, the positive welding electrode is heated more, and the weld nugget therefore shifts from a symmetrical position on the contact surface between the workpieces being welded towards the positive welding electrode. If such a shift is undesirable, the poles of the voltage can be reversed if reversible, direct voltage is applied to the welding electrodes. Consequently, the electrode that was first negatively poled and then positively poled after reversal is heated more strongly.

This for example prevents the formation of an asymmetrical weld nugget on the contact surface between the workpieces being welded. It is however possible to use the method according to the invention to keep effects disadvantageous to the welding process from arising due to different wear of the weld electrodes, for example from the formation of an asymmetrical weld nugget on the contact surface between the workpieces being welded.

A particular advantage of the method according to the invention is that it requires minimum equipment.

According to the invention, it is sufficient to only measure the first voltage during welding and use this information to control or regulate the resistance welding process. To prepare this embodiment of the method, experiments can be performed e.g. under predetermined reference conditions in which the first as well as the second voltages are measured. Based on the experiments, the relationship of the position of the weld nugget to the first voltage can, for example, be determined and saved in a control device. The data saved in this manner can, for example, indicate the voltage between the first welding electrode and workpiece that it contacts at which the weld nugget assumes an essentially symmetrical position in relation to the contact surface between the workpieces being welded, and can indicate the first voltage at which the weld nugget assumes an asymmetrical position in relation to the contact surface. If welding is then performed under the reference conditions, the first voltage will be adjusted during the welding procedure over essentially the same time as in the prior experiments. Since the prior experiments provide an essentially precise position of the weld nugget in relation to the first voltage, one can determine whether the weld nugget is forming in the desired position during welding exclusively by measuring the first voltage.

An extraordinarily advantageous development of the teaching according to the invention provides that a second voltage is also measured between the second welding electrode and a second workpiece being welded. This embodiment substantially increases the reliability of the information obtained by the method according to the invention for evaluating the quality of the resistance welding connection and/or to control or regulate the resistance welding method.

A development of the above-cited embodiment provides that at least one parameter (especially the amplitude, the rms value, or the average over time of the measured first voltage) is related to a corresponding parameter of the measured second voltage. The voltages can, for example, be related by subtracting the measured amplitudes from each other to, for example, calculate the difference between the voltage amplitudes to indicate a difference between the above output component as defined under item 1, and the above output component as defined under item 3.

Another development of the method according to the invention provides that the amplitude of the first voltage is compared with the amplitude of the second voltage.

In the cited embodiments, evaluation results (e.g. the difference between the first and second voltages, or the results of the comparison of the first and second voltages) can be used to influence the welding procedure so that the first and second voltages assume preset or desired values.

Another embodiment of the method according to the invention provides that at least one of the measured voltages is compared with a predetermined or programmed or preset setpoint. The first and second voltages can be compared separately with the setpoint. It is, however, also possible for example to compare the difference between the two voltages with a target difference.

Another development of the method according to the invention provides that the first voltage and/or the second voltage is/are measured while welding at one or more predetermined times and/or times selected during the welding procedure, or they are measured continuously, or at least continuously over a period of time. Corresponding to the respective requirements, the first and/or second voltage can be measured once or repeatedly at predetermined times. It is, however, also possible to measure the first voltage and/or the second voltage continuously during the entire welding procedure or only over periods during the welding procedure. Continuous measurement is especially preferable when the voltage amplitudes are expected to change quickly during welding.

It is also sufficient to use the measured voltage(s) to evaluate whether the resistance welding connection corresponds to predetermined requirements. In this embodiment, the quality of the resistance welding connection is evaluated, and this evaluation can occur either during or after welding using the voltage measured during welding.

An extremely advantageous development of the teaching according to the invention provides that at least one parameter of the welding process is controlled or regulated as a function of the measured voltage or voltages. This embodiment allows the welding process to be influenced online within wide boundaries. In this embodiment, the welding process can e.g. be controlled or regulated to produce any desired position or desired size of the weld nugget relative to the contact surface between the workpieces being welded, or to produce a desired degree of wear of the welding electrodes, or to compensate for a different degree of wear between the weld electrodes.

A development of the above-cited embodiment provides that at least one of the measured voltages is compared with a predetermined or preset reference voltage, and that the parameter(s) of the welding procedure is/are controlled as a function of the comparative results.

In a development of the above-cited embodiments, the parameters of the welding process can comprise at least the following:
the amplitude of the welding current,
the welding time,
the shape of the curve of the welding current,
the pulse shape and/or pulse frequency of a pulsed welding current,
the voltage at the secondary winding of the welding transformer,
the polarity of the voltage at the welding electrodes, and
a force that at least one of the welding electrodes exerts on at least one of the workpieces being welded.

The parameters used to influence the welding procedure can be selected over a wide range corresponding to the respective demands.

Depending on respective requirements, it is possible to measure at least one of the voltages between one of the welding electrodes and a surface facing this welding electrode of the workpiece contacted by this welding electrode, and/or between one of the welding electrodes and a surface facing away from this welding electrode of the workpiece contacted by this welding electrode, and/or between one of the welding electrodes and a surface facing away from this welding electrode of the workpiece contacting the other welding electrode as provided in the developments of the method according to the invention. If the welding procedure is influenced by the transfer resistances between the welding electrodes and the workpieces that they contact, it is useful to determine a transfer resistance between the assigned welding electrode and the workpiece that it contacts from at least one of the measured voltages.

It is also possible to determine from at least one of the measured voltages an output that is dissipated by a transfer resistance between one of the welding electrodes and the workpiece that it contacts, and/or a transfer resistance between the workpieces being welded as is provided by another embodiment.

Another embodiment of the teaching according to the invention provides that a determination is made of at least one of the welding electrodes is contacting its assigned workpiece by means of at least one of the measured voltages. In this embodiment, e.g. a start signal can be generated for the welding process by means of the method according to the invention as soon as the measured voltage indicates that the respective electrode is contacting its assigned workpiece. It is, however, also possible to interrupt for the welding procedure as soon as the measured voltage indicates that one of the welding electrodes no longer contacts its assigned workpiece.

It is also possible according to the invention to measure a voltage that depends on the first voltage, especially one that is proportional to the first voltage, instead of measuring the first voltage between the first welding electrode and the first workpiece being welded.

Furthermore it is also possible to convert the measured voltage into a current or another quantity related to the measured voltage, and to measure this quantity instead of the voltage to obtain information for evaluating the quality of the resistance welding connection and/or to control or regulate the resistance welding procedure.

The same holds true for measuring the second voltage as well as other voltages.

The measured voltages can be measured at any suitable location of the welding electrode, or respective workpiece, or electrically conductive parts connect to these parts in any manner.

A respective method and device according to the invention, as well as various advantageous and useful embodiments thereof, are set forth below.

The invention will be further explained below with reference to the attached, schematic drawings that represent exemplary embodiments of a device according to the invention for implementing the method according to the invention.

DETAILED DESCRIPTION OF THE INVENTION

Figure 1:
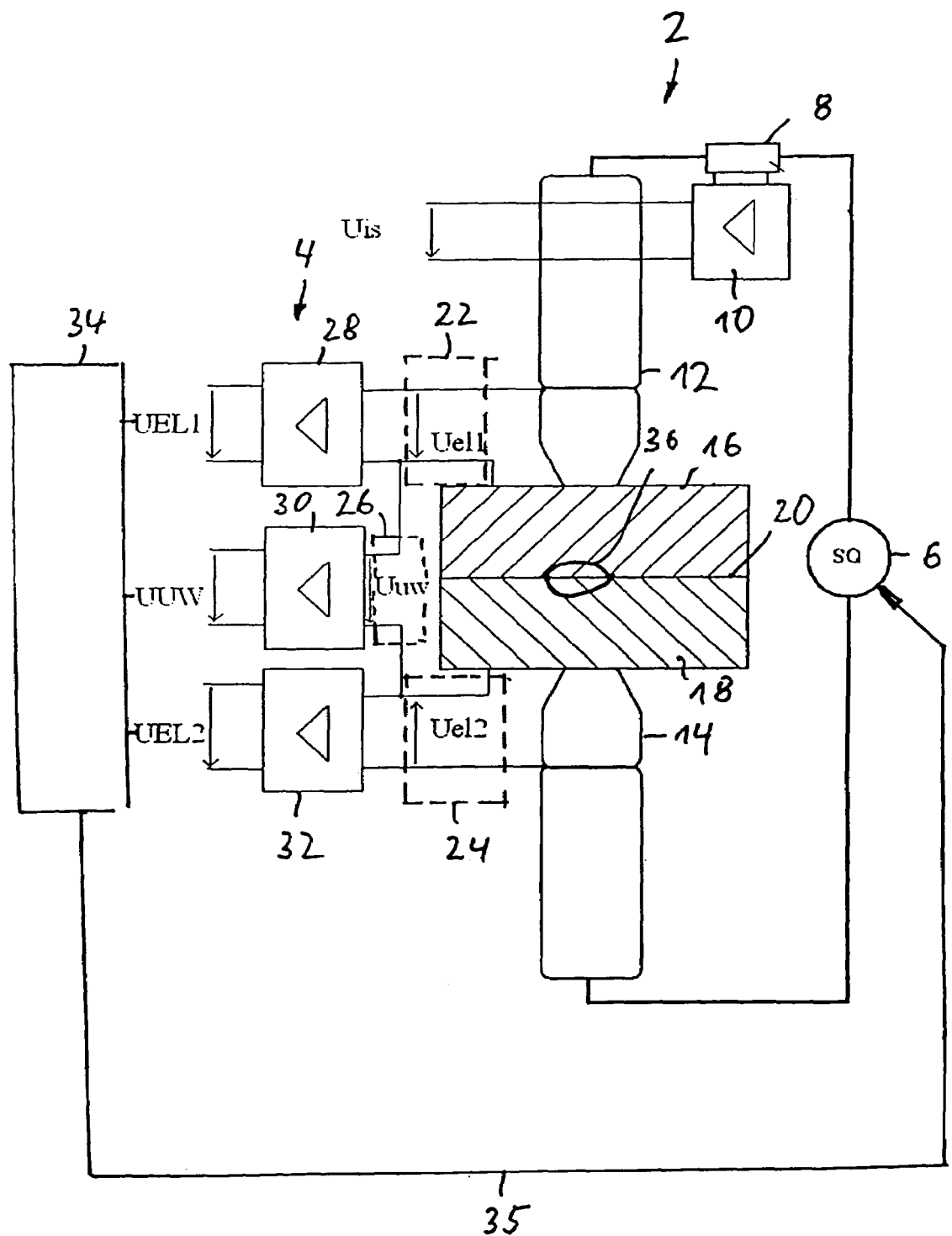
FIG. 1 shows a schematic side-view of a device according to the invention to implement the method according to the invention.

In the drawing Figures, equivalent and corresponding components are assigned the same reference numbers.

FIG. 1 shows a device 2 for resistance welding and a device 4 according to the invention for obtaining information to evaluate the quality of any resistance welding connection and/or to control or regulate the resistance welding method. Only the components necessary to explain the method according to the invention are shown. The other components are omitted.

The device 2 for resistance welding has a current source 6 to generate a welding current whose amplitude can be sensed by a current sensor 8. An isolation amplifier 10 that converts the current from the sensor into a voltage is connected to the current sensor 8. The device 2 also has a first welding electrode 12 and a second welding electrode 14 that are connected to the voltage source 6 via feed lines 2. In this exemplary embodiment, the device 2 serves to create a resistance welding connection between a first workpiece 16 and a second workpiece 18 that abut each other along a contact surface 20 and are pressed against each other by the welding electrodes 12, 14.

When the device 2 is operated, the voltage source 6 generates a welding current that flows through the first welding electrode 12, the first workpiece 16, the second workpiece 18 and the second welding electrode 14, and a weld nugget is formed on the contact surface 20 during welding. A "welding procedure" according to the invention is understood to be the formation of a resistance welding connection, i.e., a weld spot or a weld seam. During the welding procedure, a welding voltage is applied to the welding electrodes 12, 14 that is a direct voltage whose polarity can be reversed in this exemplary embodiment. It is however also possible to use alternating voltage as the welding voltage instead of direct voltage.

The device 4 according to the invention in this exemplary embodiment includes a first voltmeter 22 to measure a first voltage between the first welding electrode 12 and the first workpiece 16, whereby the first voltage is tapped directly at the first voltage electrode 12 and the surface of the first workpiece 16 facing the first welding electrode 12. In addition, the device 4 according to the invention has a second voltmeter 24 to measure a second voltage between the second welding electrode and the second workpiece 18; the second voltage is sensed directly at the second welding electrode 14 and the second surface of the second workpiece 18 facing the weld electrode 14.

Furthermore, a third voltmeter 26 is provided in this exemplary embodiment that measures the voltage between the first workpiece 16 and the second workpiece 18.

The output signals of the voltmeters 22, 24, 26 are fed to an isolation amplifier 28, 30, 32 whose output signals are supplied to an evaluating device or control device 34 that is connected to the current source 6 via a control line 35 so that the parameters of the welding procedure (in this exemplary embodiment, the welding current amplitude, the welding time, the curve shape of the welding current, the polarity of the voltage at the welding electrodes and the force that the welding electrodes 12, 14 exert on the workpieces 16 and 18 to which they are assigned) are controlled or regulated as a function of the voltages measured by voltmeters 22, 24, 26.

The method according to the invention is performed as follows using the device 4 according to the invention:

During the welding procedure, i.e. the creation of a weld spot or a weld seam or a weld nugget, a welding current flows from the weld source 6 to the welding electrodes 12, 14, and the first welding electrode 12 is positive. The welding current generates a weld nugget identified with reference number 36 in FIG. 1 on the contact surface 20 between the workpieces 16, 18. During the welding procedure, the total dissipated electrical output essentially consists of the three following output components:

1. Electrical output dissipated between the first welding electrode 12 and the first workpiece 16 due to the transfer resistance existing between the welding electrode 12 and workpiece 16, 2. Electrical output dissipated at the contact surface 20 between the workpieces 16, 18, and 3. Electrical output dissipated between the second welding electrode 14 and the second workpiece 18 due to the transfer resistance arising between the welding electrode 14 and workpiece 18.

Since the same current flows through the welding electrodes 12, 14 and workpieces 16, 18 while welding, the voltage measured by the first voltmeter 22 belonging to the above output component as defined under 1 is proportional to the voltage measured by the second voltmeter 24 for the above output component as defined under 3.

During welding, the first voltage is measured continuously by the first voltmeter 22, and the second voltage is measured continuously by the second voltmeter 24 in this exemplary embodiment. If the measurement of the voltages indicates that the amplitude of the first voltage is essentially the same as the amplitude of the second voltage, the above output component as defined under 1 is hence essentially the same as the above output components defined under 3, so that the two welding electrodes 12, 14 heat up essentially the same, and the weld nugget 36 remains essentially symmetrical relative to the contact surface 20.

If, in contrast, a measurement of the voltages indicates that the first voltage is higher than the second voltage, the above output component as defined under 1 is hence larger than the above output component as defined under 3, so that the positive welding electrode 12 heats up more which cause is the position of the weld nugget 36 to shift toward the positive electrode 12 relative to the contact surface 20. If such a shift is undesirable, the evaluation and control device controls the voltage source 6 to reverse the polarity of the voltage applied to welding electrodes 12, 14. In this manner, one can reliably keep the uneven heating of the welding electrodes 12, 14 from undesirably shifting the weld nugget 36.

It is also however possible according to the invention to specifically control the position and/or size of the weld nugget 36 corresponding to the respective requirements by using the method according to the invention.

The method according to the invention uses very little equipment to obtain reliable information for evaluating the quality of a resistance welding connection and/or to control or regulate a resistance welding method. It is particularly suitable for the online control or regulation of a resistance welding procedure.

Figure 2:
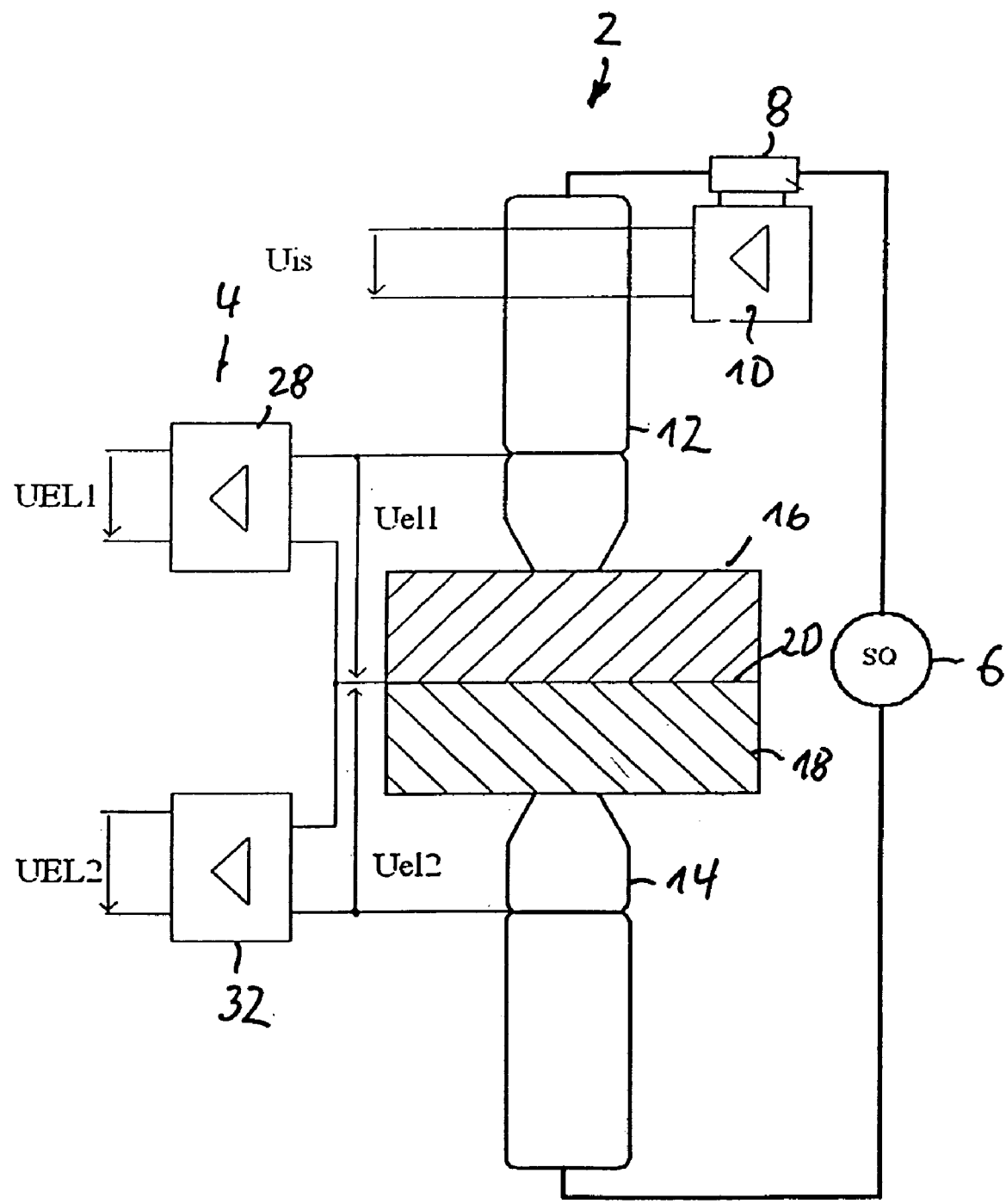
FIG. 2 shows a schematic second exemplary embodiment of a device according to the invention, shown in a manner as in FIG. 1.

FIG. 2 shows a second exemplary embodiment of a device 4 according to the invention that differs from the exemplary embodiment in FIG. 1 in that the first of voltage is tapped at the surface of the first workpiece 16 facing away from the first welding electrode 12, and the second voltage is tapped and the surface of the second workpiece 18 facing away from the second welding electrode 14.

Figure 3:
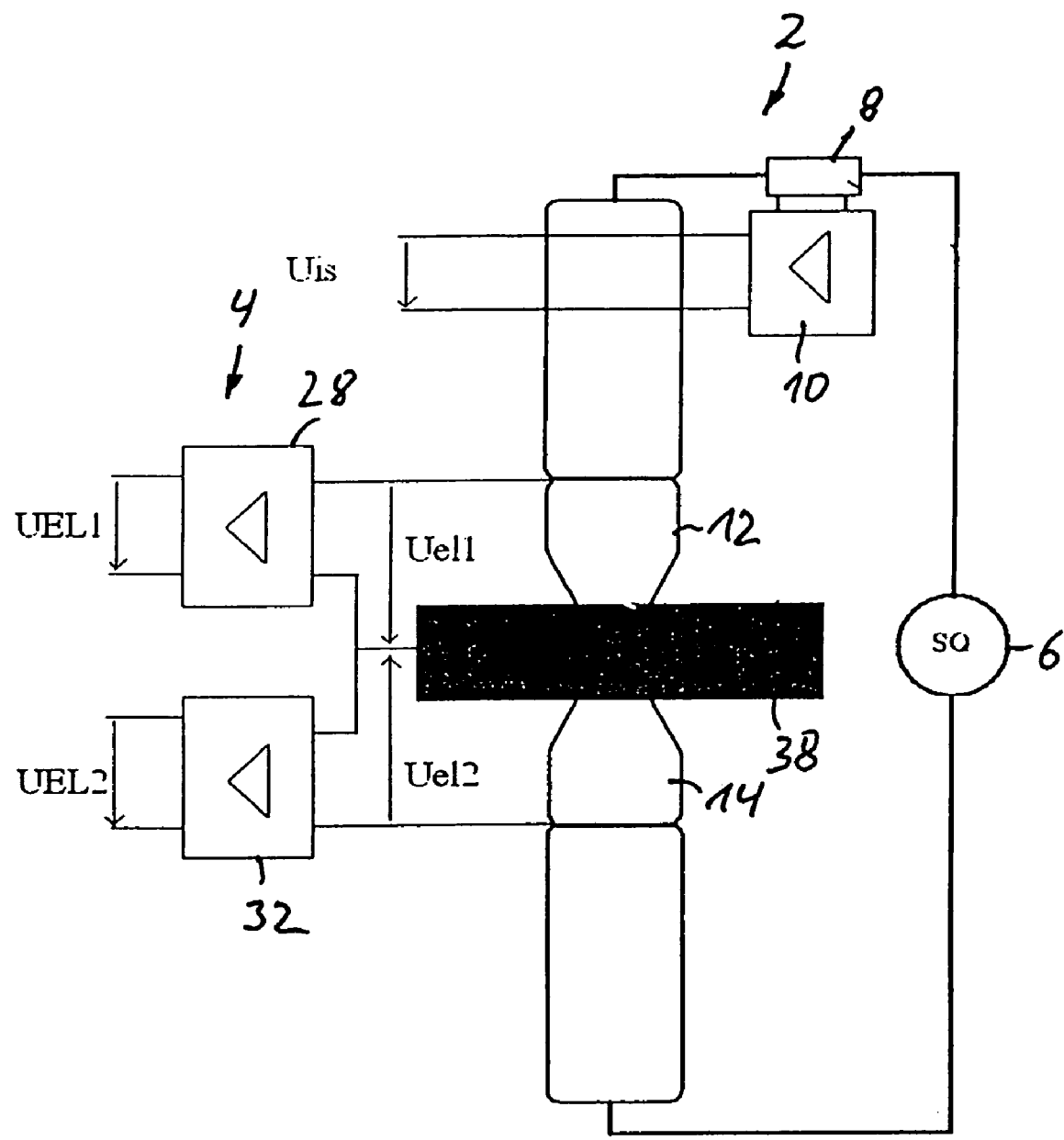
FIG. 3 shows a schematic arrangement to calibrate the device according to FIG. 2, shown in a manner as in FIG. 2.

FIG. 3 shows an arrangement to calibrate the evaluation and control device 34. Instead of workpieces 16, 18, a calibration workpiece 38, e.g. consisting of copper, is used on which the welding electrodes 12, 14 are placed. When the welding electrodes 12, 14 are placed on the workpiece, welding current generated by a voltage source 6 flows through the calibration workpiece 38, and the first meter 22 measures the voltage between the first welding electrode 12 and the calibration workpiece 38, and the second voltmeter 24 measures the voltage between the second welding electrode 14 and calibration workpiece 38. The measured voltages can be used to calibrate the evaluation and control device 34.

Figure 4:
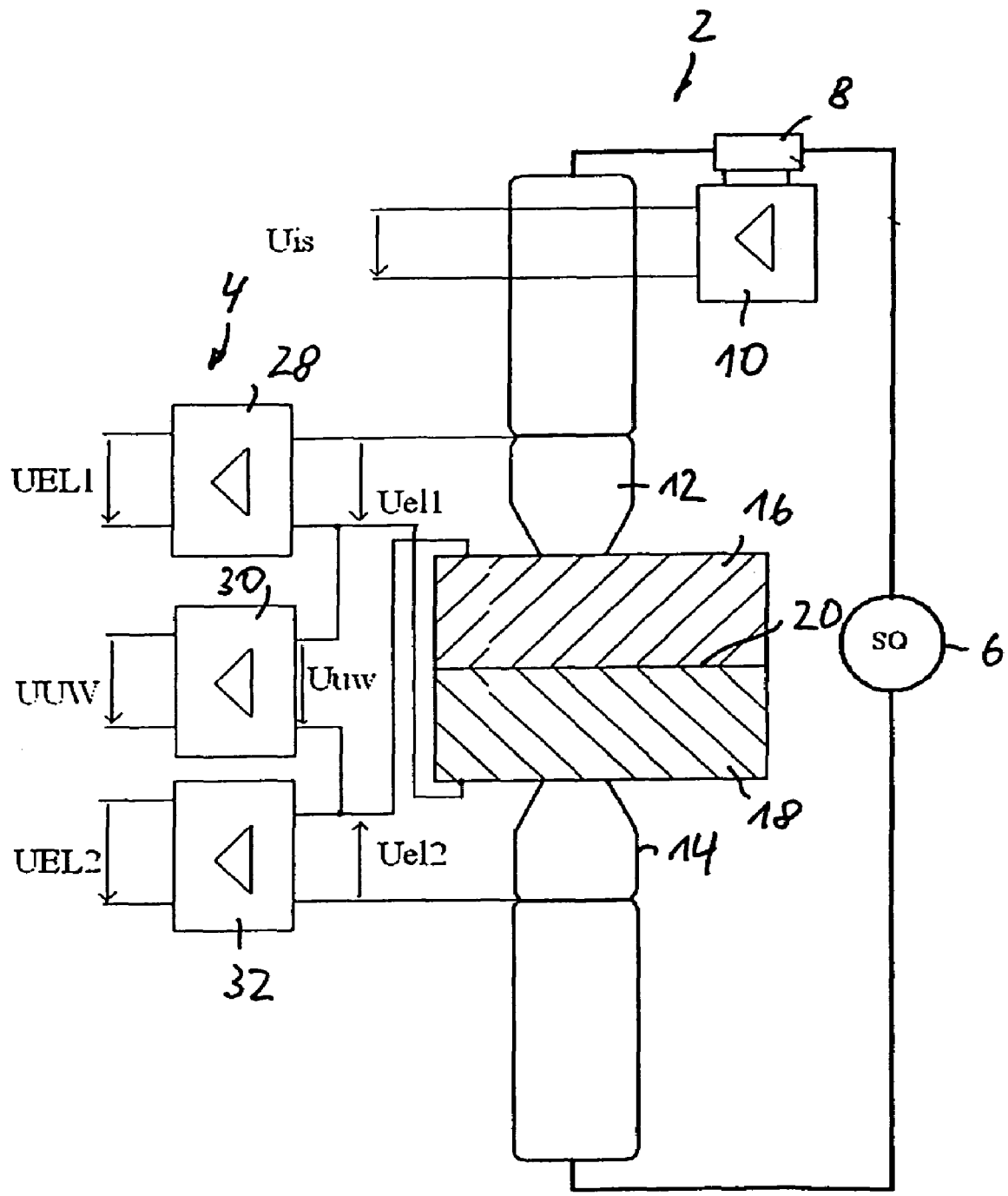
FIG. 4 shows a schematic third exemplary embodiment of a device according to the invention, shown in a manner as in FIG. 1.

FIG. 4 shows a third exemplary embodiment of a device according to the invention that differs from the exemplary embodiment in FIG. 1 in that a measurement is taken of the first voltage between the first welding electrode 12 and the surface of the second workpiece 18 facing away from the first welding electrode 12, and the second voltage between the second welding electrode 14 and the surface of the first workpiece 16 facing away from the second welding electrode 14.

Figure 5:
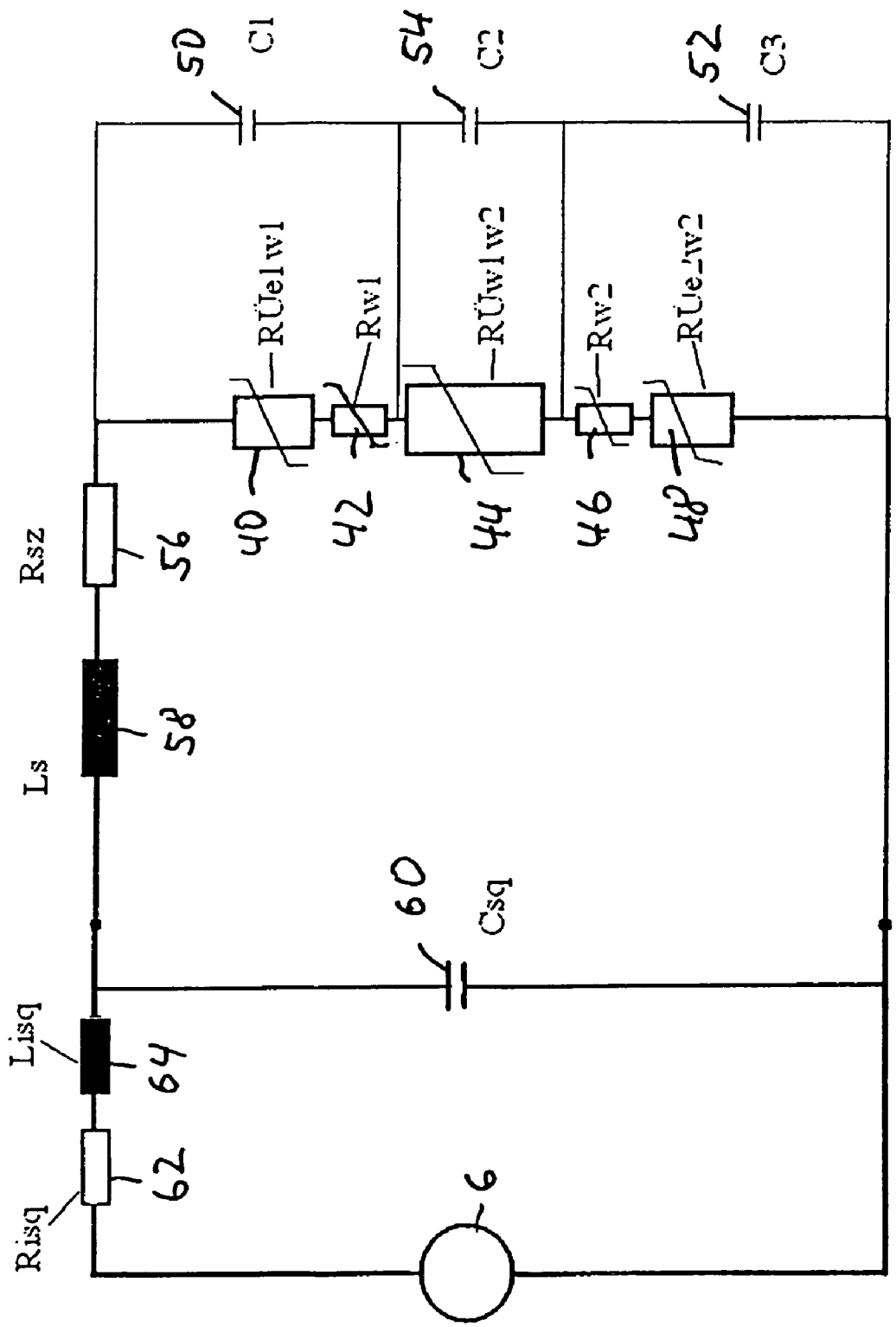
FIG. 5 shows a schematic substitute circuit diagram of an arrangement for a resistance welding method.

FIG. 5 shows a simplified substitute circuit diagram that shows an arrangement including the device 2 and work pieces 16, 18. As can be seen in FIG. 5, this arrangement has a series circuit of five (5) ohmic resisters 40, 42, 44, 46, 48 that can change linearly or nonlinearly (usually nonlinearly) during the welding procedure based on a change in temperature and/or a change in pressure.

In particular, the nonlinear ohmic resistor 40 represents the transfer resistance between the first welding electrode 12 and the first workpiece 16, and the nonlinear ohmic resistor 48 correspondingly represents the transfer resistance between the second welding electrode 14 and second workpiece 18. The nonlinear ohmic resistor 42 represents the resistance of the first workpiece 16, whereas the nonlinear ohmic resistor 48 correspondingly represents the ohmic resistance of the second workpiece 18.

The nonlinear ohmic resistor 44 represents the transfer resistance at the contact surface between the workpieces 16, 18.

Ohmic resistor 40 essentially dissipates the electrical output (above output component defined under 1) between the first welding electrode 12 and the first workpiece 16, and ohmic resistor 48 essentially dissipates the electrical output (above output components as defined under 3) between the second welding electrode 14 and the second workpiece 18. Ohmic resistor 44 dissipates the output component of the electrical output that forms the weld nugget 36 at the contact surface 20 between the workpieces 16, 18 being welded (above output component as defined under 2).

Reference number 50 indicates a parasitic capacitor between the two welding electrodes 12 and first workpiece 16, whereas reference number 52 indicates a parasitic capacitor between the second welding electrode 14 and second workpiece 18. The reference number 54 indicates a parasitic capacitor between workpieces 16, 18. As can be seen from FIG. 5, capacitor 50 is parallel connected to the series circuit consisting of the resisters 40, 42, and capacitor 54 is parallel connected to resistor 44, and capacitor 52 is parallel connected to the series circuit consisting of resisters 46, 48.

Reference number 56 identifies ohmic resistor of the electrode holder having one of the welding electrodes 12, 14, whereas the inductor of the secondary circuit of the welding transformer is identified with reference number 58.

A capacitor of the voltage source 6 parallel to the voltage source 6 is provided with reference number 60. An ohmic inner resistor of the voltage source 6 that is assumed to be an ideal current source in FIG. 5 is identified with reference number 62, and an inductor of the ideal current source 6 is identified with reference number 64.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Resistance welding method, comprising:
    a) performing a resistance welding procedure on workpieces, the resistance welding procedure being performed during a welding period in which welding current flows;
    b) measuring a first voltage between a first welding electrode and a first workpiece of the workpieces being welded during the welding period of the resistance welding procedure; and
    c) controlling at least one parameter of the resistance welding procedure as a function of the first measured voltage during the welding period.

2. Method as in claim 1, wherein:
    a) a second voltage is measured between a second welding electrode and a second workpiece being welded during the resistance welding procedure.

3. Method as in claim 2, wherein:
    a) at least one parameter of the measured first voltage is correlated with a corresponding parameter of the measured second voltage, the at least one parameter of the measured first voltage includes one of the amplitude, the rms value, and the average value over time.

4. Method as in claim 3, wherein:
    a) the at least one parameter of the first voltage is compared with the corresponding parameter of the second voltage.

5. Method as in claim 2, wherein:
    a) at least one of the measured first and second voltages is compared with a predetermined or programmed set point.

6. Method as in claim 2, wherein:
    a) at least one of the first voltage and the second voltage is measured at least one time during the welding period of the resistance welding procedure, and the at least one time is one of a predetermined time, a time selected during welding, a time measured continuously, and over a period of time.

7. Method as in claim 2, wherein:
    a) at least one of the first and second voltages is measured between a respective one of the first and second welding electrodes and a surface facing the respective one of the first and second welding electrodes of the respective one of the workpieces contacting the respective welding electrode.

8. Method as in claim 2, wherein:
    a) one of the first and second voltages of one of the first and second welding electrodes is measured between a surface of a workpiece contacted by the one of the first and second electrodes, and which workpiece is contacted by the one of the first and second electrodes.

9. Method as in claim 2, wherein:
    a) one of the first and second voltages of one of the first and second welding electrodes is measured between a surface of a workpiece contacted by the one of the first and second electrodes, and which workpiece is contacted by the other one of the first and second electrodes.

10. Method as in claim 2, wherein:
    a) one of a transfer resistance between a respective one of the first and second welding electrodes and the respective workpiece contacted by it, and a transfer resistance between the respective workpiece to be welded is calculated from at least one of the measured voltages.

11. Method as in claim 2, wherein:
    a) one of an output is calculated from at least one of the measured voltages which is dissipated by a transfer resistance between one of the welding electrodes and the workpiece that it contacts, and a transfer resistance between the workpiece being welded.

12. Method as in claim 2, wherein:
    a) at least one of the first and second measured voltages is used to determine if at least one of the first and second welding electrodes contacts its assigned workpiece.

13. Method as in claim 1, wherein:
    a) the first measured voltage is used to evaluate if the resistance welding connection corresponds to at least one predetermined requirement.

14. Method as in claim 1, wherein:
    a) the first measured voltage is used to determine a size of a weld nugget forming during the resistance welding procedure, and a position of a weld nugget relative to a contact surface between the workpieces being welded.

15. Method as in claim 1, wherein:
    a) the first measured voltage is compared with one of a predetermined and programmed reference voltage, and that the at least one parameter of the resistance welding procedure is one of controlled and regulated as a function of the comparative results.

16. Method as in claim 1, wherein:
a) the at least one parameter of the resistance welding procedure includes at least one of:
   i) an amplitude of a welding current;
   ii) a welding time;
   iii) a shape of a curve of a welding current;
   iv) at least one of a pulse shape and a pulse frequency of a pulsed welding current;
   v) a voltage at a secondary winding of a welding transformer;
   vi) a polarity of the first measured voltage at the first welding electrode; and
   vii) a force that at least the first welding electrode exerts on at least the first workpiece of the workpieces being welded during the welding period of the resistance welding procedure.

17. Resistance welding device, comprising:
a) an element configured for obtaining information to evaluate at least one parameter of a resistance welding connection in a resistance welding procedure during a welding period, the welding period being the period in which welding current flows;
a) a voltmeter operatively associated with the element, the voltmeter being configured for measuring at least a first voltage between a first welding electrode and a first workpiece of a plurality of workpieces to be welded during the welding period of the resistance welding procedure; and
b) a control element being provided, the control element being configured for controlling the at least one parameter of the resistance welding procedure as a function of one of the first and second measured voltages during the welding period of the resistance welding procedure.

18. Device as in claim 17, wherein:
a) the voltmeter is configured for measuring a second voltage during the resistance welding procedure, the second voltage being between a second welding electrode and a second workpiece of the plurality of workpieces to be welded during the welding period of the resistance welding procedure.

19. Device as in claim 18, wherein:
a) an evaluation element is provided, the evaluation element being configured for relating a parameter including one of an amplitude, an rms value, and an average over time of the measured first voltage with a corresponding parameter of the measured second voltage.

20. Device as in claim 19, wherein:
a) the evaluation element is configured for comparing the parameter of the first voltage with the parameter of the second voltage.

21. Device as in claim 18, wherein:
a) a comparison element is provided, the comparison element being configured for comparing at least one of the measured first and second voltages with one of a predetermined and programmed setpoint.

22. Device as in claim 18, wherein:
a) the voltmeter is configured for measuring at least one of the first voltage and the second voltage at least one time during the resistance welding procedure, and the at least one time is one of a predetermined time, a time selected during welding, a time measured continuously, and over a period of time.

23. Device as in claim 18, wherein:
a) an evaluation element is provided, the evaluation element being configured for evaluating whether a resistance welding connection corresponds to predetermined requirements by using the first and second measured voltages.

24. Device as in claim 18, wherein:
a) the control element is configured for one of controlling and regulating the at least one parameter of the resistance welding procedure as a function of results of a comparison of at least one of the first and second measured voltages with one of a predetermined or programmed reference voltage.

25. Device as in claim 24, wherein:
a) the control element is configured for one of controlling and regulating the at least one parameter of the resistance welding procedure, and which includes at least one of:
   i) an amplitude of a welding current;
   ii) a welding time;
   iii) a shape of a curve of a welding current;
   iv) at least one of a pulse shape and a pulse frequency of a pulsed welding current;
   v) a voltage at a secondary winding of a welding transformer;
   vi) a polarity of the first measured voltage at the first welding electrode; and
   vii) a force that at least the first welding electrode exerts on at least the first workpiece of the workpieces being welded during the welding period of the resistance welding procedure.

26. Resistance welding method, comprising:
a) performing a resistance welding procedure on workpieces, the resistance welding procedure being performed during a welding period in which welding current flows;
b) measuring a first voltage between a first welding electrode and a first workpiece of the workpieces being welded during the welding period of the resistance welding procedure;
c) measuring a second voltage between a second welding electrode and a second workpiece being welded during the resistance welding period;
d) correlating at least one parameter of the measured first voltage with a corresponding parameter of the measured second voltage, the at least one parameter of the measured first voltage including one of the amplitude, the rms value, and the average value over time; and
e) controlling at least one parameter of the resistance welding procedure as a function of a result of the correlating of the at least one parameter of the measured first voltage with the corresponding parameter of the measured second voltage.

27. Method as in claim 26, wherein:
a) the at least one parameter of the first voltage is compared with the corresponding parameter of the second voltage.

28. Method as in claim 26, wherein:
a) at least one of the measured first and second voltages is compared with a predetermined or programmed set point.

29. Method as in claim 26, wherein:
a) at least one of the first voltage and the second voltage is measured at least one time during the resistance welding procedure, and the at least one time is one of a predetermined time, a time selected during welding, a time measured continuously, and over a period of time.

30. Method as in claim 26, wherein:
a) the first measured voltage is used to evaluate if the resistance welding connection corresponds to at least one predetermined requirement.

* * * * *